United States Patent [19]
Bauwens et al.

[11] 3,933,972
[45] Jan. 20, 1976

[54] PROCESS FOR PREPARING PURE SODIUM BICHROMATE

[75] Inventors: Robert Bauwens, Saint-Leu-La Foret; Robert Lefrancois, Paris, both of France; Michel Gabriel, Casablanca, Morocco

[73] Assignee: Products Chimiques Ugine Kuhlmann, Paris, France

[22] Filed: Feb. 11, 1974

[21] Appl. No.: 441,652

[52] U.S. Cl. ............ 423/57; 423/58; 423/596; 423/597; 23/302 R; 23/301 R; 23/305 R
[51] Int. Cl.² ........................... C01G 37/14
[58] Field of Search ........... 423/53, 55, 57, 58, 596, 423/597; 23/301 R, 302 R, 305

[56] References Cited
UNITED STATES PATENTS

| | | | |
|---|---|---|---|
| 2,583,591 | 1/1952 | Penin et al. | 423/58 |
| 2,612,435 | 9/1952 | Penin et al. | 423/58 |
| 2,839,359 | 6/1958 | Dunning | 423/58 |
| 3,027,245 | 3/1962 | Kearley | 423/596 |
| 3,137,541 | 6/1964 | Cooke | 23/302 X |
| 3,451,766 | 6/1969 | Schafer et al. | 23/302 X |

FOREIGN PATENTS OR APPLICATIONS 262,107 11/1970 U.S.S.R. .................. 23/302

Primary Examiner—Herbert T. Carter
Attorney, Agent, or Firm—Brooks Haidt Haffner & Delahunty

[57] ABSTRACT

Processes for preparing vanadium- and chlorine-free sodium bichromate which comprises concentration of a sodium chromate liquor so as to cause formation of crystals of neutral sodium chromate tetrahydrate, separation of these crystals from their mother liquor, treatment thereof with sulfuric acid, concentration of the acid solution obtained, and after separation of insoluble sodium sulfate so formed, crystallization of sodium bichromate.

10 Claims, 1 Drawing Figure

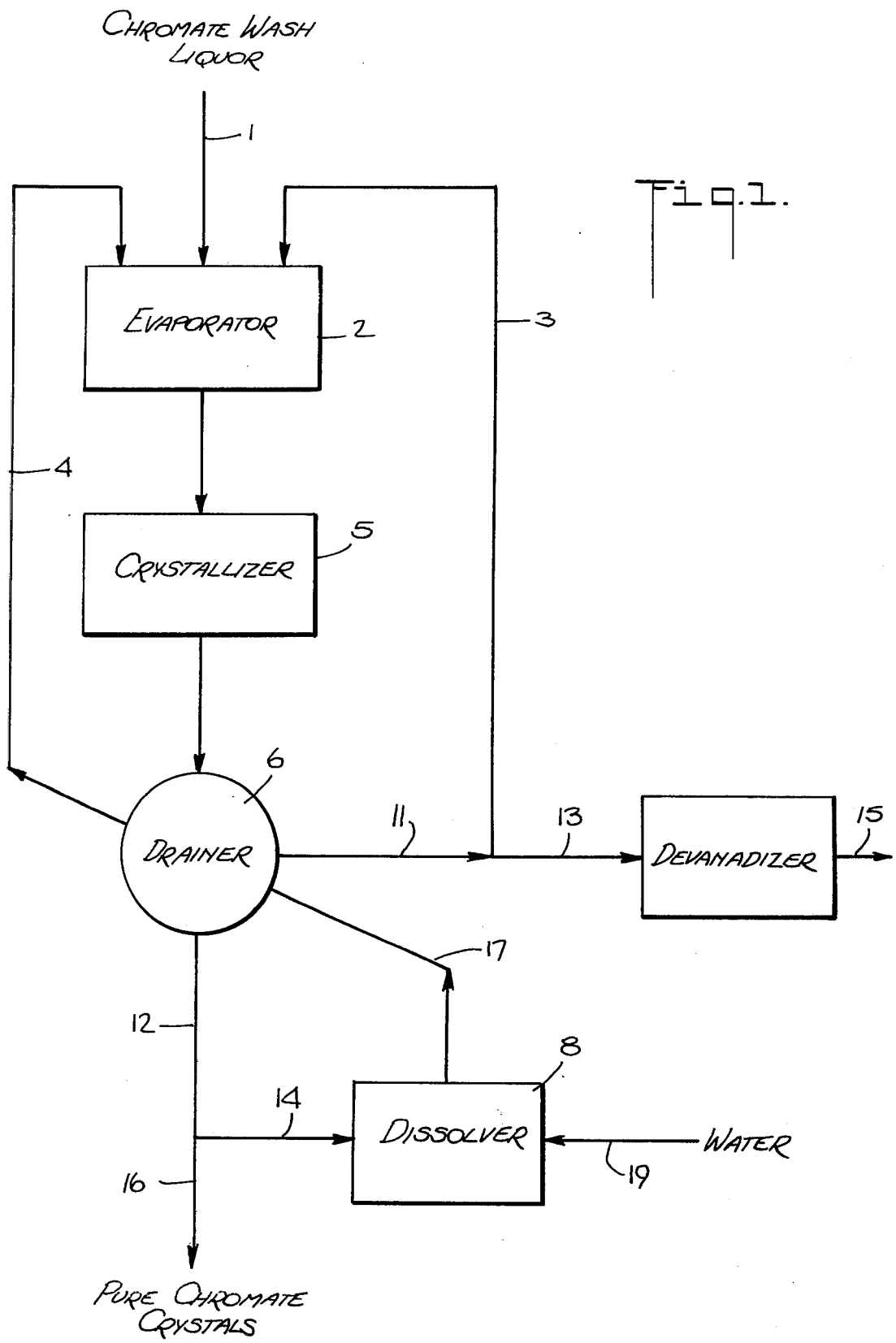

PROCESS FOR PREPARING PURE SODIUM BICHROMATE

BACKGROUND OF THE INVENTION

The present invention relates to processes for producing crystallized sodium bichromate and more particularly to an improvement of the classical procedure of preparing crystallized sodium bichromate dihydrate, $Na_2Cr_2O_7 \cdot 2H_2O$, to permit production of a very pure product free from chlorine and vanadium impurities, such impurities arising either from the original chrome ore or from materials used in the treatment of such ore.

It is known to produce sodium bichromate by various methods. Industrially, the preparation is carried out starting with chrome-containing minerals of which the most usual is chromite. The ore is subjected to an alkaline oxidation to form sodium chromate, and the chromate is separated from the mineral gangue by lixiviation or leaching with water. The resulting sodium chromate solution is freed of alumina by precipitation using partial acidification to a pH of about 9. The solution or wash liquor of neutral sodium chromate obtained is converted to bichromate liquor by treatment with sulfuric acid. The insoluble sodium sulfate formed during the acid treatment is separated, and the remaining liquor is concentrated to cause crystallization of the sodium bichromate. One such process is shown in German Pat. No. 113,086, issued July 20, 1900.

The sodium bichromate obtained by the foregoing classical process is not pure. Chlorine and vanadium impurities are present, and these are particularly troublesome for uses in which the products derived from sodium bichromate are generally destined. These products are, for example, chromic acid and the basic sulfates of chromium. In particular, the presence of vanadium is totally prohibited in chromium sulfate utilized in tanneries because it causes the appearance of brownish stains on the tanned leather.

In the past the chemical methods to eliminate the vanadium contained in sodium bichromate or in its solutions have not been economical. It has been proposed to obtain vanadium-free sodium bichromate by subjecting the chromate solution to a special treatment for removing the vanadium, for example by a lime treatment which eliminates the vanadium in the form of insoluble calcium metavanadate. This treatment presents cost difficulties because it occasions a loss of chrome values in insoluble forms, especially increasing with high content of trioxide, $Cr_2O_3$, in the chromate wash.

THE INVENTION

The process of the present invention permits preparation in a simple and efficient manner of pure sodium bichromate without losses to appreciably increase the cost of obtaining a product. The invention rests on the surprising discovery that, starting with the sodium chromate wash liquor containing the impurities, it is possible to obtain crystals of this chromate salt which do not contain any of the aforesaid impurities and to concentrate the wash liquor in a manner so as to cause crystallization of sodium chromate tetrahydrate. This discovery is especially surprising when it is considered that concentration of the impure bichromate wash liquor always leads to impure crystals of sodium bichromate.

The process of the present invention for preparation of sodium bichromate accordingly consists of concentrating the sodium chromate liquor in such a manner that the formation of crystals of the tetrahydrate of neutral chromate of sodium is caused, separating such crystals from the mother liquor, treating these crystals with the sulfuric acid and concentrating the aqueous solution obtained after separation of the insoluble sodium sulfate formed to cause sodium bichromate crystallization.

The present invention is further described with reference to FIG. 1.

The sodium chromate wash liquor utilized in the present invention can be prepared by any of the known procedures. Such processes are described, for example, by Paul Pascal in Traite de Chimie Minerale (1933 edition) Volume 10, page 545.

The operating conditions for intermediate crystallization of the neutral sodium chromate according to the present invention are set forth hereinafter.

The concentration of the sodium chromate wash liquor is carried out to provide crystallization of the neutral sodium chromate tetrahydrate by operation in a temperature range where this salt is stable, more specifically, at a temperature below about 60°C. It is desirable in carrying out the present invention to operate at a temperature between 26° and 60°C. It can be advantageous to provide evaporation of the wash liquor very rapidly below atmospheric pressure. This can be carried out at reduced pressure, preferably at a pressure between 10 and 100 mm Hg. For example, when the concentration is carried out at a temperature between 30° and 40°C, a pressure between 10 and 30 mm Hg is utilized.

It has also been discovered that the purity of the neutral sodium chromate tetrahydrate crystals, and accordingly of the sodium bichromate prepared starting with the tetrahydrate, is optimum when the pH of the sodium chromate wash liquor is adjusted, depending on its concentration, to a value between about 7 and about 8.5, and preferably between about 7.2 and about 7.4. In the case where the sodium chromate wash liquor is provided by alkaline oxidation of chromite minerals, its pH, which is in the neighborhood of 9 after the alumina removal step is lowered. This can readily be carried out by the addition of an acid, desirably a mineral acid such as sulfuric acid, in appropriate quantity, but it is preferred to utilize for this purpose the mother liquor remaining from a preceding crystallization of sodium bichromate.

Concentration of the chromate wash liquor may be pushed sufficiently far to have a higher yield of tetrahydrate crystals. However, beyond a certain limit, the mass obtained becomes difficult to handle and the crystals, even if they are well drained, retain a certain amount of the mother liquor and this lowers the purity of the final salt obtained. It has been found that it is possible to obtain good purity of chromate crystals and at the same time an easy-to-handle mass by concentrating the wash liquor so that between 30 and 50 percent of the quantity of $Cr_2O_3$ values initially contained in the wash liquor is crystallized. The mother liquor accordingly contains from about 50 to about 70 percent of the initial $Cr_2O_3$ value after crystallization, and its concentration of $Cr_2O_3$ is then between about 28 and 29 percent. All parts, percentages, proportions and ratios herein are by weight, unless otherwise indicated.

It is possible to obtain a very high crystallization efficiency which may reach 96 percent, without experiencing the difficulties mentioned above in connection with the prior art methods by diluting the mass with chromate mother liquor obtained from previous operation of the process.

Even under these conditions, the purity of the chromate tetrahydrate crystals obtained may be found to be greatly reduced if there is a large amount of impurities in the initial chromate wash liquor. In this case it is possible to rid the crystals of such impurities by subjecting them to a wash with an aqueous solution of pure sodium chromate prepared by dissolving in water a portion of the crystals obtained in previous operation of the process. The wash solution should have a $C_rO_3$ concentration substantially equal to that of the mother liquor, that is, 28 to 29 percent of $C_rO_3$. The wash can be carried out at a temperature between 25° and 60°C, and it is preferably carried out between 30° and 40°C.

The sodium bichromate dihydrate is obtained by treating an aqueous sodium chromate solution prepared in the manner described hereinafter by treatment with concentrated sulfuric acid.

It may be equally advantageous to operate with recycle of the bichromate mother liquor. By way of example, it has been found that about ten parts of chrome, in the form of sodium chromate tetrahydrate crystals, can be dissolved in a volume of recycled sodium bichromate solution corresponding to about 15 parts of the chrome. The mixture is acidified down to a pH of between about 3.9 and 4.3, preferably to about 4, with sulfuric acid while maintaining the temperature between 50° and 60°C. The quantity of chrome values entrained by the precipitating sodium sulfate which is separated is very small, in general less than about 0.25 percent of the sodium sulfate. The solution is thereafter concentrated in any convenient manner known in the art to cause crystallization of the sodium bichromate dihydrate.

The mother liquor from the crystallization of the neutral sodium chromate still contains a certain quantity of $C_rO_3$. This can be utilized for the preparation of sodium bichromate intended for uses which can tolerate the presence of chlorine and vanadium, such as the preparation of pigments. Nevertheless it may be noted that the residual liquor is susceptible to treatment by any appropriate method, for example, treatment with lime to reduce the amount of vanadium contained therein. The volume of mother liquor is small by comparison to the amount of the initial chromate wash liquor and thus the equipment required for its treatment is not considerable and the cost of such purification minimal, in comparison with that where all the chromate wash solution is purified according to the prior art technique.

The process of the present invention can be carried out continuously or batchwise. FIG. 1 of the single drawing attached hereto schematically shows by way of example one way for the continuous operation of the stage for formation of sodium chromate tetrahydrate crystals, and the present invention will be further described with reference to the drawing.

A chromate wash liquor is introduced through conduit 1 into an evaporator 2 equipped with cooling means and operating under reduced (i.e., subatmospheric) pressure. Recycled mother liquor is simultaneously introduced into evaporator 2 through conduit 3, and the chromate liquor used to wash the sodium chromate crystals can be supplied through conduit 4. The slurry of chromate crystals leaving evaporator 2 is conducted to the crystallizer 5 where it is cooled to between 25° and 30°C, then through drainer 6 maintained at the same temperature.

The mother liquor issuing from the drainer through line 11 is divided into two fractions, the more important fraction is recycled to evaporator 2 via conduit 3; the othe fraction is removed or sent through line 13 to reactor 7 for devandization treatment to provide devanadated liquor which issues through conduit 15. The crystals of sodium chromate tetrahydrate, $Na_2\cdot C_rO_4 \cdot 4H_2O$ formed in drainer 6 are washed with a solution of pure sodium chromate introduced through line 17 and having a chromium trioxide content of 28 to 29 percent, the pure chromate solution being made up in dissolver 8 with water introduced into dissolver 8 through line 19 and part of the pure sodium chromate crystals. The washed chromate crystals leaving drainer 6 are withdrawn through line 12. One part of the pure crystals is introduced through line 14 to the dissolver to provide the aqueous wash solution; the other part is removed from the cycle as product through line 16. In controlling the proportion of recycled mother liquor through line 3, the proportion of chromate obtained in the form of crystals, i.e., the crystallization yield, can be varied at will. The yield can be as high as 96 percent and in this case the volume of mother liquor removed through conduit 13 (and optionally subjected to devanadization) is found to be reduced to the neighborhood of 4 percent of the initial volume of wash liquor.

The following examples describe preparation of pure sodium chromate starting with an impure solution of sodium chromate according to the procedure of this invention. The chromate wash utilized in these examples is one provided by alkaline oxidative roasting of chromate minerals.

The following examples are given to illustrate embodiments of the invention as it is presently preferred to practice it. It will be understood that these examples are illustrative, and the invention is not to be considered as restricted thereto except as indicated in the appended claims.

EXAMPLE I

A 174 g quantity of chromate wash solution, from which the alumina has been removed is adjusted to a pH of 8 by the addition of a small quantity of sodium bichromate and is found to have the following composition:

$C_rO_3$, 250 g/liter or 19 percent $C_rO_3$;
vanadium, 60 mg/liter or 240 ppm based on the $C_rO_3$ content;
sodium chloride, 1 g/liter or 0.4 g for 100 g of $C_rO_3$.

This is concentrated by evaporation under vacuum at a pressure of 20 mm Hg with constant agitation and at a temperature of between 30° and 40°C up to a 33 percent $C_rO_3$ concentration, this being obtained when the total weight is about 100 g. Then a few crystals of sodium chromate tetrahydrate are added to serve as seeds and the solution is allowed to stand while it is maintained at a temperature of 26°C. After 12 hours the crystals formed are drained in a Buchner funnel and are washed with a pure sodium chromate solution containing 28 percent $C_rO_3$ prepared from pure crystals provided by a previous operation. These various steps are carried out at a temperature of 26°C.

There are thus obtained two parts, the first comprising 32.4 g of sodium chromate crystals containing 41.9 percent $C_rO_3$, or 98 percent sodium chromate tetrahydrate (the theoretical amount of $C_rO_3$ being 42.7 percent). This corresponds to a crystallization yield of 41 percent of the chromium trioxide values contained in the initial wash liquor. The other part is 67.6 g of mother liquor containing 28.5 percent $C_rO_3$. The quantity of vanadium in the tetrahydrate crystals so obtained is 5 ppm, based on $C_rO_3$. Sodium chloride is present only in trace amounts.

EXAMPLE II

A three-liter vessel supplied with an agitator, heated by means of a steam coil and having vacuum-producing means, is charged with 1353 g of sodium chromate wash liquor from which alumina has been removed and which is adjusted to a pH of 8 by addition of sodium bichromate mother liquor. This starting material has 18.5 percent $C_rO_3$ and 44 mg/kg of vanadium, corresponding to 240 ppm based on the quantity of $C_rO_3$, corresponding to 250 g of $C_rO_3$ and 0.060 g of vanadium. The vessel is further charged with 1249 g of mother liquor enriched in vanadium from a previous operation so that it contains 28.6 percent $C_rO_3$ and 0.14 percent vanadium. Finally, the vessel is also charged with 100 g of a chromate wash liquor containing 28 percent $C_rO_3$, this liquor having been used to wash sodium chromate crystals.

The solution is concentrated, with heating to a temperature of between 30° and 40°C under a pressure of 20 mm Hg, to a weight of 1950 g, which corresponds to an average quantity of 33 percent $C_rO_3$. The mixture of crystals and liquor is allowed to set for 12 hours at a temperature between 26° and 30°C and the crystals are then separated from the mother liquor by filtration or drainage in a Buchner funnel.

There is obtained 1292 g of mother liquor containing 28.6 percent $C_rO_3$ and about 0.14 percent vanadium from which is removed 43 g containing 12 g of $C_rO_3$ and 0.060 g of vanadium. The remaining 1249 g of mother liquor is introduced to a concentration step carried out as previously described. The crystals are washed in the Buchner utilizing 100 g of pure sodium chromate solution containing 28 percent $C_rO_3$, obtained by dissolving 68 g of previously purified crystals in 32 g of water. The washing is effected at a temperature between 26° and 30°C. The wash solution is separately removed and returned to the evaporator.

After the draining operation, 648 g of sodium chromate crystals are obtained (68 g of them are deducted for preparation of the solution serving to wash the crystals). The remaining 580 g constitutes the production of sodium chromate tetrahydrate having the composition determined on the washed, undried, salt, and the material is found to contain 41 percent $C_rO_3$ (the theoretical amount being 42.7 percent) and 10 ppm of vanadium, based upon the amount of $C_rO_3$. This corresponds to 96 percent pure $Na_2C_rO_4 \cdot 4H_2O$.

The recovery yield of chrome values in the form of pure crystals of sodium chromate tetrahydrate if 95 percent. These crystals can be utilized as is for the production of pure sodium bichromate by known techniques.

It will be understood from the present description that the term "draining" used herein includes methods of separating solid particles from a liquid. The various operations which can be used are filtration such as in a Buchner funnel, screening, classification, centrifugation, and such similar methods known to those skilled in the art.

We claim:

1. A process for preparing sodium bichromate substantially free of vanadium and chlorine which comprises concentrating a sodium chromate liquor obtained from chrome-bearing minerals to form crystals of sodium chromate tetrahydrate, separating the tetrahydrate crystals from the liquor and recovering the crystals, treating the separated crystals with sulfuric acid to form the bichromate and recovering the sodium bichromate after separation of insoluble sodium sulfate formed.

2. A process according to claim 1 wherein the bichromate solution formed by acid treatment of the separated crystals is concentrated to form insoluble sodium sulfate and the sulfate is separated prior to recovery of the bichromate.

3. A process according to claim 1 wherein the sodium bichromate is recovered by crystallization.

4. A process according to claim 1 wherein the sodium chromate liquor is concentrated at a temperature between about 26° and 60°C.

5. A process according to claim 1 wherein the sodium chromate liquor is concentrated under a pressure between about 10 and 100 mm Hg.

6. A process according to claim 1 wherein the pH of the sodium chromate liquor is adjusted to a pH between about 7 and 8.5.

7. A process according to claim 1 wherein the tetrahydrate crystallization is carried out from a solution containing from about 30 to 50 percent $C_rO_3$.

8. A process according to claim 1 wherein the tetrahydrate crystals of sodium chromate are, before treating with sulfuric acid, dissolved in recycled mother liquor of sodium bichromate in the proportion of from about ten parts of $C_rO_3$ from the tetrahydrate crystals of sodium chromate to about 15 parts of $C_rO_3$ from the mother liquor of sodium bichromate.

9. A process according to claim 8 wherein the treatment with sulfuric acid of the solution of tetrahydrate of sodium chromate in recycled solution of sodium bichromate is carried out at a pH between about 3.9 and 4.3 and a temperature between about 50° and 60°C.

10. A process according to claim 1 wherein the sodium chromate liquor is obtained from the alkaline oxidation of a chrome-containing mineral.

* * * * *